(12) United States Patent
You (10) Patent No.: US 7,185,665 B2
(45) Date of Patent: Mar. 6, 2007

(54) GOLF BAG UMBRELLA

(76) Inventor: Ching-Chuan You, P.O. Box 1-79, Taipei (TW)

( * ) Notice: Subject to any disclaimer, the term of this patent is extended or adjusted under 35 U.S.C. 154(b) by 143 days.

(21) Appl. No.: 10/302,892

(22) Filed: Nov. 25, 2002

(65) Prior Publication Data

US 2004/0099295 A1 May 27, 2004

(51) Int. Cl.
*A45B 3/00* (2006.01)
(52) U.S. Cl. .................. 135/16; 135/15.1; 135/25.1; 248/125.8; 248/161; 248/231.81; 206/315.3
(58) Field of Classification Search .............. 135/20.3, 135/33.6, 15.1, 16, 25.1, 25.4; 206/315.3; 150/156; 403/377, 109.1; 248/161, 157, 248/188.5, 125.8, 231.81
See application file for complete search history.

(56) References Cited

U.S. PATENT DOCUMENTS

| | | | | | |
|---|---|---|---|---|---|
| 3,304,036 | A | * | 2/1967 | Davis | 248/514 |
| 3,602,466 | A | * | 8/1971 | Drowns | 248/514 |
| 3,866,934 | A | * | 2/1975 | Braun | 280/655 |
| 3,892,251 | A | * | 7/1975 | Warfield | 135/15.1 |
| 4,522,300 | A | * | 6/1985 | Hamblet | 206/315.4 |
| 4,790,338 | A | * | 12/1988 | Strobl | 135/16 |
| D338,327 | S | * | 8/1993 | Lewis | D3/5 |
| 5,261,434 | A | * | 11/1993 | Fodero | 135/16 |
| 5,297,570 | A | * | 3/1994 | Conner | 135/16 |
| 5,423,584 | A | * | 6/1995 | Pasternak | 294/19.2 |
| D370,336 | S | * | 6/1996 | Rosier | D3/5 |
| 5,878,763 | A | * | 3/1999 | Tsai | 135/25.33 |
| 5,947,138 | A | * | 9/1999 | DeAngelis | 135/16 |
| 6,058,952 | A | * | 5/2000 | Lin et al. | 135/29 |
| 6,199,819 | B1 | * | 3/2001 | Churillo | 248/540 |
| 6,263,891 | B1 | | 7/2001 | Hartwell et al. | 135/33.2 |
| 6,296,001 | B1 | * | 10/2001 | Lin et al. | 135/31 |
| 6,330,887 | B1 | * | 12/2001 | Chen | 135/16 |
| 6,435,469 | B1 | * | 8/2002 | Ratcliff et al. | 248/535 |
| D476,475 | S | * | 7/2003 | You | D3/5 |

* cited by examiner

*Primary Examiner*—Amy J. Sterling (57) ABSTRACT

An umbrella for use in a golf bag for protecting items stored in the golf bag, the umbrella comprising: a telescopic shaft including an upper sliding tube, and a lower support tube for slidingly receiving a portion of the upper sliding tube, the lower support tube having a ring fixed therearound; an inverted U-shaped clip fixed to the ring, the clip being capable of fastening to a golf bag; wherein a canopy comprises a first canopy having a substantially flat frame of concave disk-shaped portion and a second canopy having a substantially vertical frame of a truncated, hollow cone-shaped section so that the items within the golf bag are covered by the canopy when the shaft is retracted and the clip is secured to the golf bag.

6 Claims, 8 Drawing Sheets

GOLF BAG UMBRELLA

BACKGROUND OF THE INVENTION

1. Field of the Invention

The present invention relates to umbrellas and more particularly to an umbrella for use in a golf bag for protecting items such as golf clubs stored in the golf bag.

2. Description of Related Art

Figure 11:
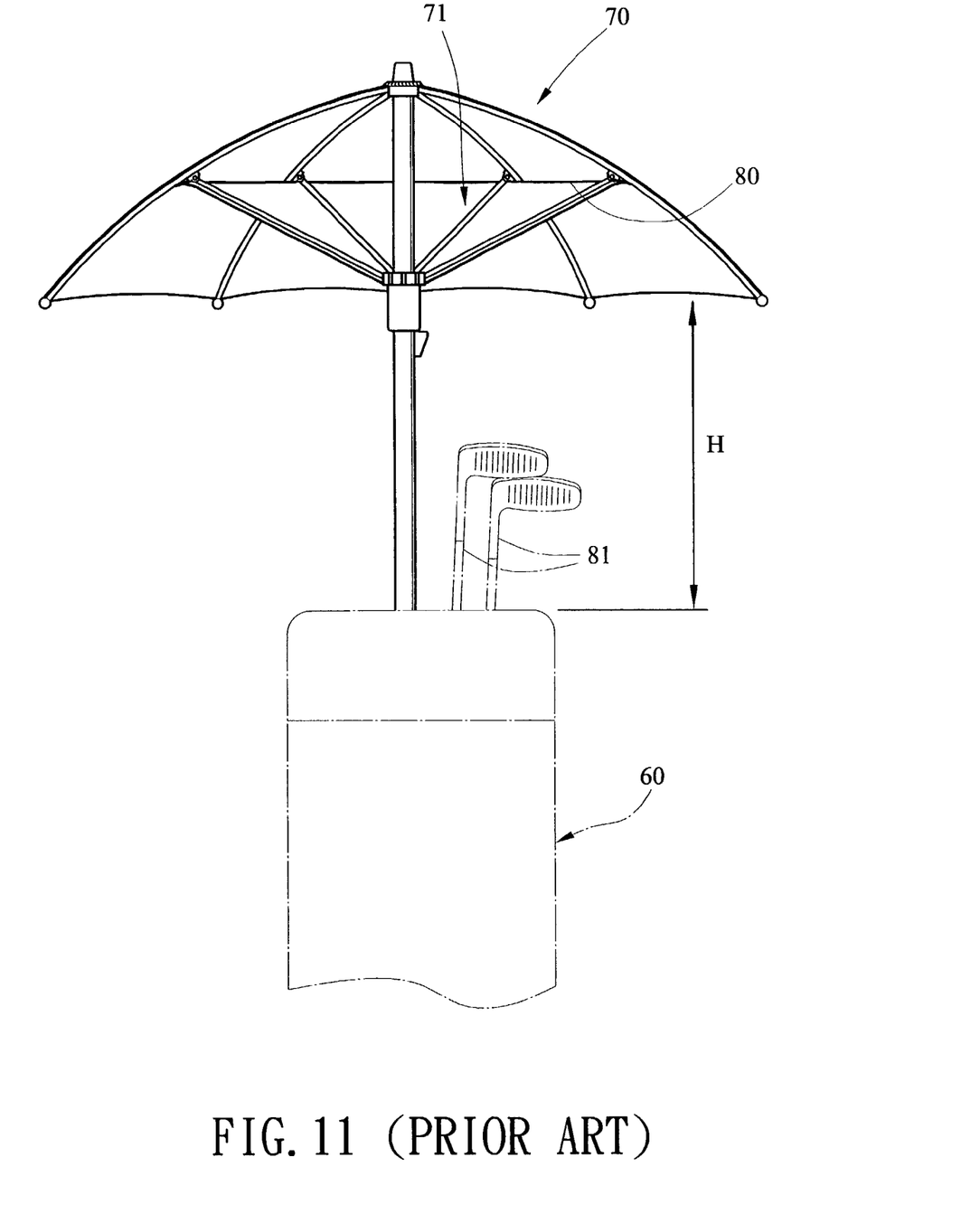
FIG. 11 is a side view of a conventional golf bag umbrella.

A conventional umbrella 70 disclosed in U.S. Pat. No. 6,263,891 for protecting golf clubs 81 stored in a golf bag 60 from an adverse weather condition such as rainy day is shown in FIG. 11. One of the important technical characteristics of the umbrella 70 is a mesh netting type protective cover 80 beneath a plurality of straight and unattached arms 71 of a support structure of canopy. Purpose of the protective cover 80 is to prevent the golf clubs 81 from becoming entangled within the support structure of the canopy. One of drawbacks of such protective cover 80 is a complicated, difficult manufacturing process, resulting in an increase in the manufacturing cost and accordingly a poor competitiveness. Moreover, as disclosed in the patent, the canopy of the umbrella 70 is similar to a standard, compact and collapsible personal umbrella. Hence, it has a shallow depth in a fully extended state, i.e., a shorter vertical distance from the top of center point of the canopy to a circumferential edge of the fully extended umbrella 70. Such shallow depth is able to provide a better field of view to a person. Consequently, there is a relative long distance (or gap) H from the opening of the golf bag 60 to a circumferential edge of the fully extended umbrella 70. It is understood that strong wind is frequently accompanied with rain in a golf course which is typically located on a hill or field. As such, rain may be blown to fall within the golf bag 60 via the gap H by strong wind. As a result, a claimed rain protection feature can be compromised. In addition, a locking mechanism consisting of a ball and spring retainer and two indentations is implemented in the patent (see FIG. 13 of the patent). Such locking mechanism is able to lock shaft of the umbrella in either a retracted or extended position. However, a plurality of (e.g., more than two) locking positions of the shaft is not obtainable. This can cause inconvenience to a manipulation of the umbrella 70 within the golf bag 60. Thus improvement exists.

SUMMARY OF THE INVENTION

It is an object of the present invention to provide an umbrella for use in a golf bag for protective items such as golf clubs stored within the golf bag from damage.

It is another object of the present invention to provide a golf bag umbrella for facilitating a golfer to remove or insert golf clubs in the golf bag even when a protective cover is not provided.

It is still another object of the present invention to provide a golf bag umbrella having a plurality of locking positions in its telescopic shaft.

It is a further object of the present invention to provide an umbrella which is reliably secured within a golf bag.

It is still further object of the present invention to provide a portable golf bag umbrella.

To achieve the above and other objects, the present invention comprising: a stepped less telescopic shaft including an upper sliding tube, and a lower support tube for slidingly receiving a portion of the sliding tube, the lower support tube having a ring fixed therearound; an inverted U-shaped clip fixed to the ring, the clip being capable of fastening to a golf bag; and a canopy frame including an upper hub provided at the top of the sliding tube, a plurality of flexible ribs each having one end pivotably coupled to the hub and extended outward therefrom, a plurality of joints each provided at the rib, a lower sliding ring on the sliding tube, and a plurality of stretchers each having one end pivotably coupled to the joint and the other end thereof pivotably coupled to the ring, wherein putting canopy on the canopy frame, a substantially flat frame portion of a concave disk-shaped first canopy section and a substantially vertical frame portion of a truncated, hollow cone-shaped canopy section are formed so that the items within to the golf bag are covered by the canopy when the shaft is retracted and the clip is secured to the golf bag.

Preferably, the sliding tube further comprises an upper collar, an eccentric post having a diameter smaller than that of the sliding tube, a stop extended downward from the collar, and an eccentric C-shaped abutment mechanism sleeved on the eccentric post, the abutment mechanism including an upward protrusion at an open end thereof, wherein the protrusion is substantially opposite to the stop in a first position where the sliding tube is free to slide with respect to the support tube, an about 180 degrees turning of the sliding tube will cause the abutment mechanism to rotate until the protrusion is stopped by the stop at a second position where the outer surface of the abutment mechanism is urged against the inner surface of the support tube for locking the sliding tube.

Preferably, the eccentric C-shaped abutment mechanism further comprises a thick half circular block, a thin half circular block with the protrusion formed from the open end of the thin half circular block, and a flexible interconnection for coupling the thick and the thin half circular blocks together.

Preferably, each of the joints is formed at a distance of about one third to about two fifths of the length of the rib measured from the hub.

The above and other objects, features and advantages of the present invention will become apparent from the following detailed description taken with the accompanying drawings.

DETAILED DESCRIPTION OF THE PREFERRED EMBODIMENTS

Referring to FIGS. 1 to 9, there is shown a golf bag umbrella constructed in accordance with the invention. The umbrella comprises a telescopic shaft 1 (see FIGS. 1 to 4) including an upper sliding tube 20, a lower support tube 10 for slidingly receiving a portion of the sliding tube 20, the support tube 10 having a ring 11 fixed therearound, and an inverted U-shaped clip 30 having a lengthwise rectangular plate 31 integral with the ring 11 and a bent flexible fastening portion 32 wherein a recess 33 having a downward opening slightly smaller than a width of wall of any of a plurality of compartments 61 of a golf bag 60 is formed between the plate 31 and the fastening portion 32. The sliding tube 20 comprises a circumferential collar 21 having a diameter the same as itself. Beneath the collar 21, there are provided an eccentric recessed portion 210 in about a central portion, an eccentric post 211 with respect to a longitudinal axis of the sliding tube 20, the eccentric post 211 being surrounded by the eccentric recessed portion 210, and a stop 214 extended downward from the collar 21. The sliding tube 20 further comprises a C-shaped abutment mechanism 22 having a diameter smaller than that of the collar 21. The C-shaped abutment mechanism 22 is eccentric and comprises a thick half circular block 221, a thin half circular block 223, a flexible interconnection 222 for interconnecting the thick half circular block 221 and the thin half circular block 223, and a protrusion 224 projected upward from an open end of the thin half circular block 223. The C-shaped abutment mechanism 22 is sleeved on the eccentric recessed portion 210 in an assembled state. At this position, the stop 214 and the protrusion 224 are substantially opposite with respect to the eccentric post 211 (see FIG. 5).

The umbrella further comprises a canopy 40 (see FIG. 9) having a center point pivotably secured to the top of the shaft 1 (i.e., the top of the sliding tube 20). An upper hub 41 is provided at the top of the sliding tube 20. A plurality of flexible ribs 42 are pivotal about the hub 41 and are extended outward therefrom. A joint 420 at each rib 42 is formed at a distance of about one third to about two fifths of the length of the rib 42 measured from the hub 41. A plurality of stretchers 43 each has one end pivotably coupled to the joint 420 and the other end pivotably coupled to a lower ring 44 which is slidingly sleeved on the sliding tube 20. The ring 44 is secured in place by a latch 23 on the shaft 1 in a fully extended position of the umbrella. A distance between the ring 44 and the hub 41 in the fully extended position is designed to be as short as possible in order to form a substantially flat frame portion 421 of the canopy 40 and thus a concave disk-shaped first canopy section 45 are obtained. Also, a substantially vertical frame portion 422 of the canopy 40 from the joints 420 to a circumferential edge of the canopy 40 and thus a truncated, hollow cone-shaped second canopy section 46 are formed.

Figure 4:
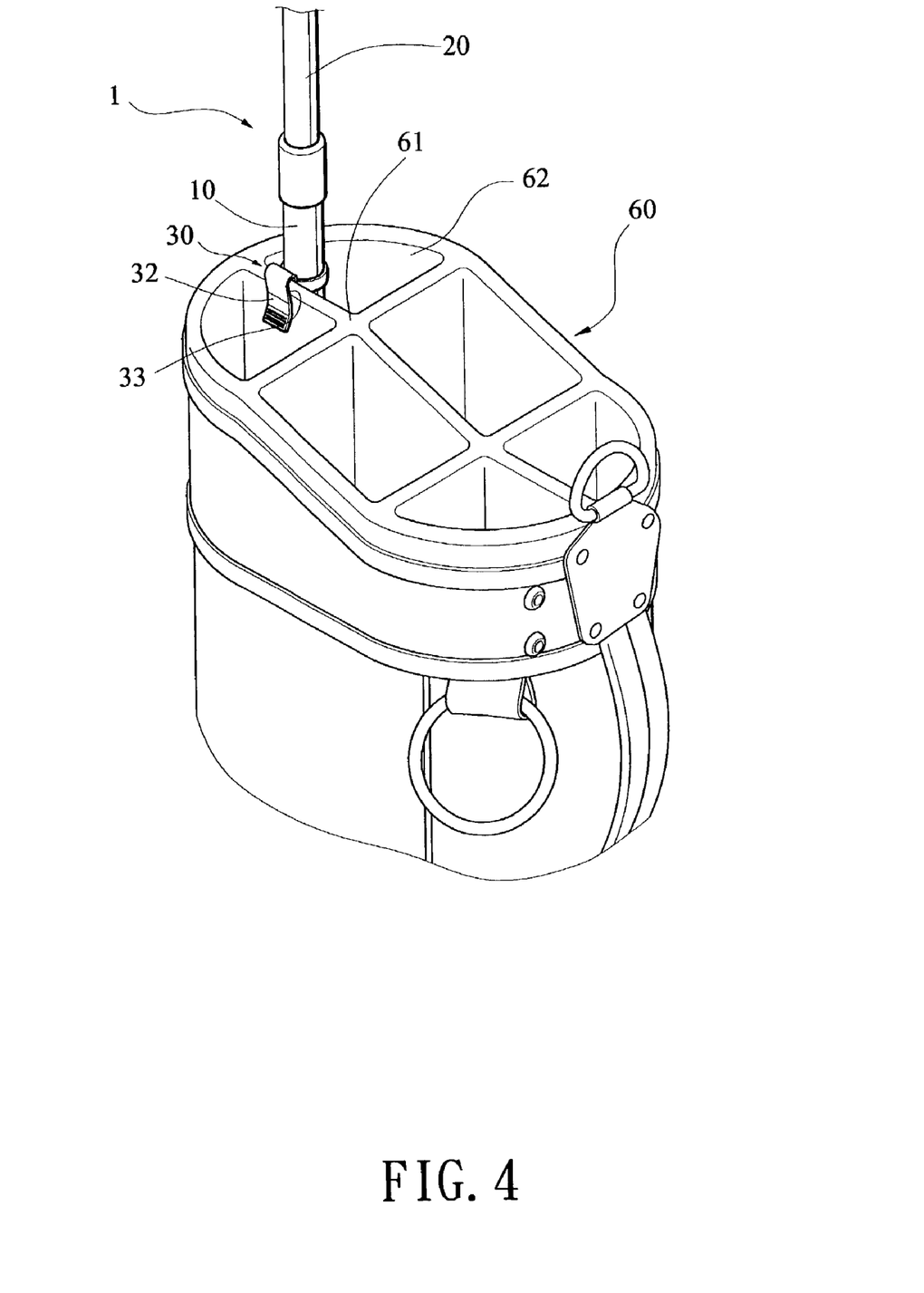
FIG. 4 is a schematic perspective view showing the shaft secured to one of a plurality of compartments in a golf bag.

Following is a description of mounting of the shaft 1 within a space 62 defined by the compartment 61. A golfer may pull the fastening portion 32 outward prior to clinging the recess 33 on a wall of the compartment 61 with portion of the shaft 1 below the clip 30 received in the space 62. As such, the wall of the compartment 61 is fastened between the fastening portion 32 and the plate 31 due to a returning resilient force of the clip 30.

Figure 5:
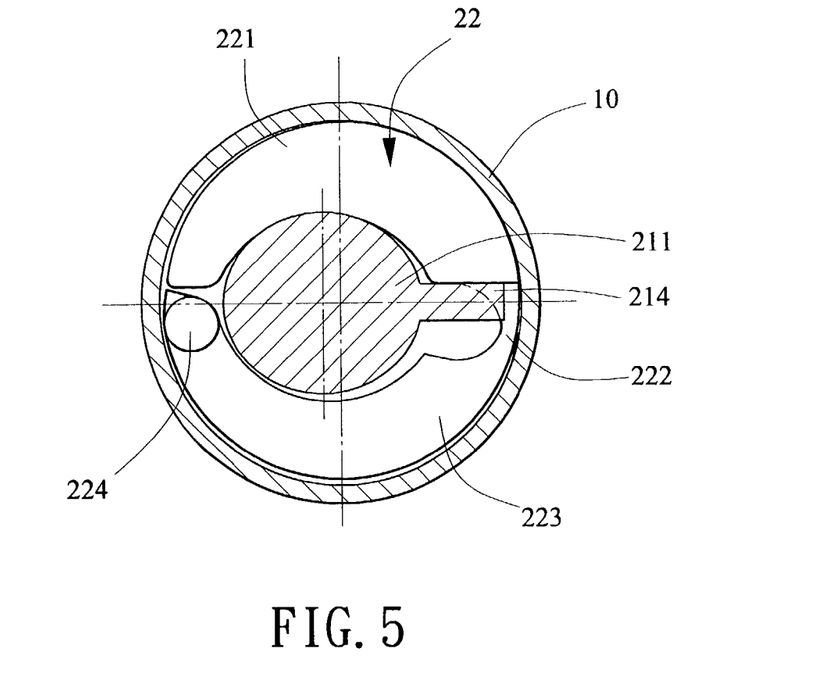
FIG. 5 is a transverse cross-sectional view of the shaft in a free sliding position.
Figure 6:
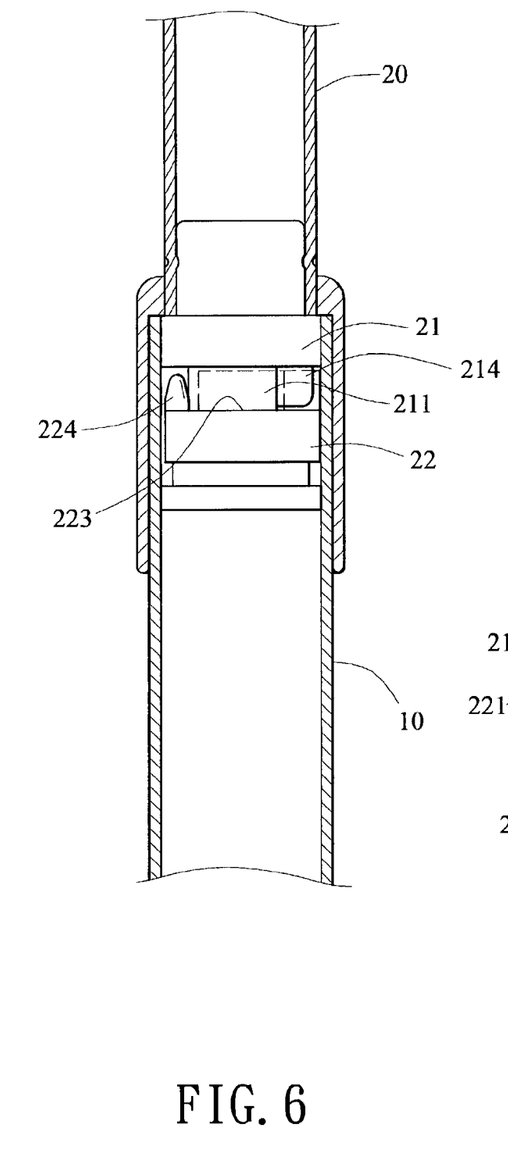
FIG. 6 is a longitudinal cross-sectional view of the shaft in the same free sliding position.
Figure 7:
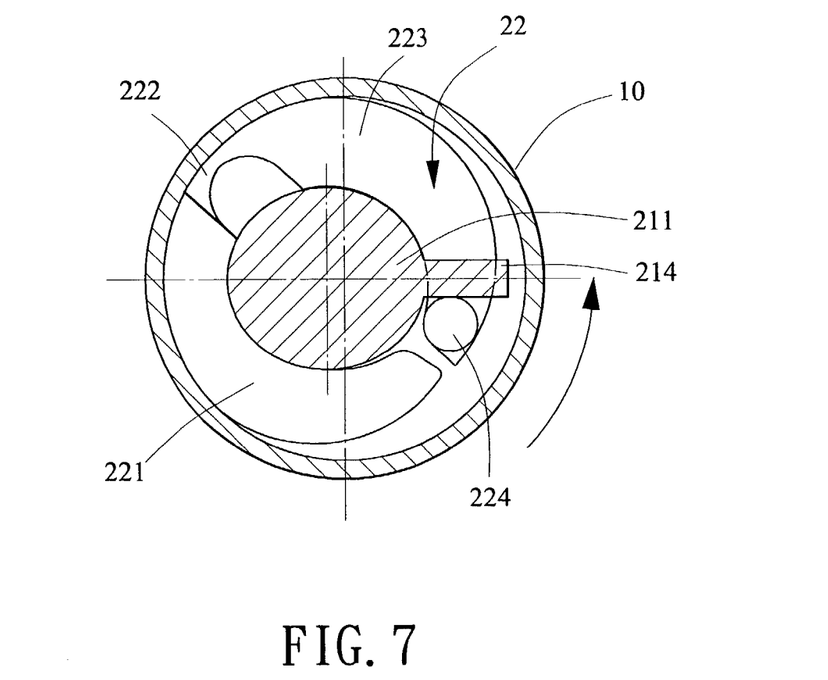
FIG. 7 is a transverse cross-sectional view of the shaft in a locked position.
Figure 8:
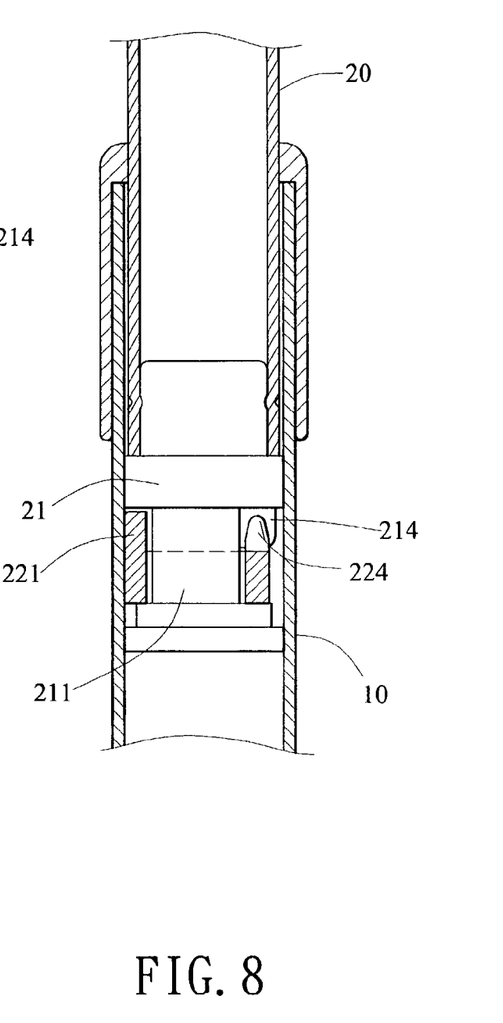
FIG. 8 is a longitudinal cross-sectional view of the shaft in the same locked position.

Referring to FIGS. 5 to 9 specifically, an operation of covering the golf clubs 81 in the golf bag 60 by the umbrella according to the invention will now be described in detail below. As shown in FIGS. 5 and 6, the sliding tube 20 is allowed to slide with respect to the support tube 10 (i.e., extend or retract the shaft 1) because there is no interference from the support tube 10 when, as stated above, the stop 214 and the protrusion 224 are substantially opposite with respect to the eccentric post 211. In a case that the shaft 1 is retracted the golf bag 60 is covered by the second canopy section 46. To the contrary, the golfer can turn the sliding tube 20 about 180 degrees to cause the internal C-shaped abutment mechanism 22 to rotate the same until the protrusion 224 is stopped by the stop 214 (see FIGS. 7 and 8). At this position, the outer surface of the C-shaped abutment mechanism 22 is urged against the inner surface of the support tube 10. As a result, the sliding tube 20 is locked. Thus, any further movement of the sliding tube 20 with respect to the support tube 10 is not allowed. Hence, the opening of the golf bag 60 is about flush with the circumferential edge of the fully extended canopy 40 and thus the golf clubs 81 are completely covered by the fully extended canopy 40. As an end, a purpose of protecting the golf clubs 81 stored in the golf bag 60 in a rainy day is achieved.

Another operation of accessing the golf clubs 81 in the golf bag 60 according to the invention will now be described in detail below. It is obvious that the golfer may turn the sliding tube 20 about 180 degrees in a direction opposite to the above to cause the internal C-shaped abutment mechanism 22 to rotate the same until the stop 214 is about aligned with the interconnection 222 at the position shown in FIG. 5. As such, the sliding tube 20 is again allowed to slide with respect to the support tube 10. In other words, the golfer can extend the shaft 1 by pulling up a ball receptacle 50 with one hand. Next, the golfer can remove and/or insert the golf club 81 from and/or into the golf bag 60 with the other hand if a distance (i.e., gap) from the top of the golf bag 60 to the circumferential edge of the fully extended canopy 40 is sufficient to permit the removal and/or insertion. A next retraction of the shaft 1 is the same operation as stated above. Thus a detailed description thereof is omitted herein for the sake of brevity.

Figure 1:
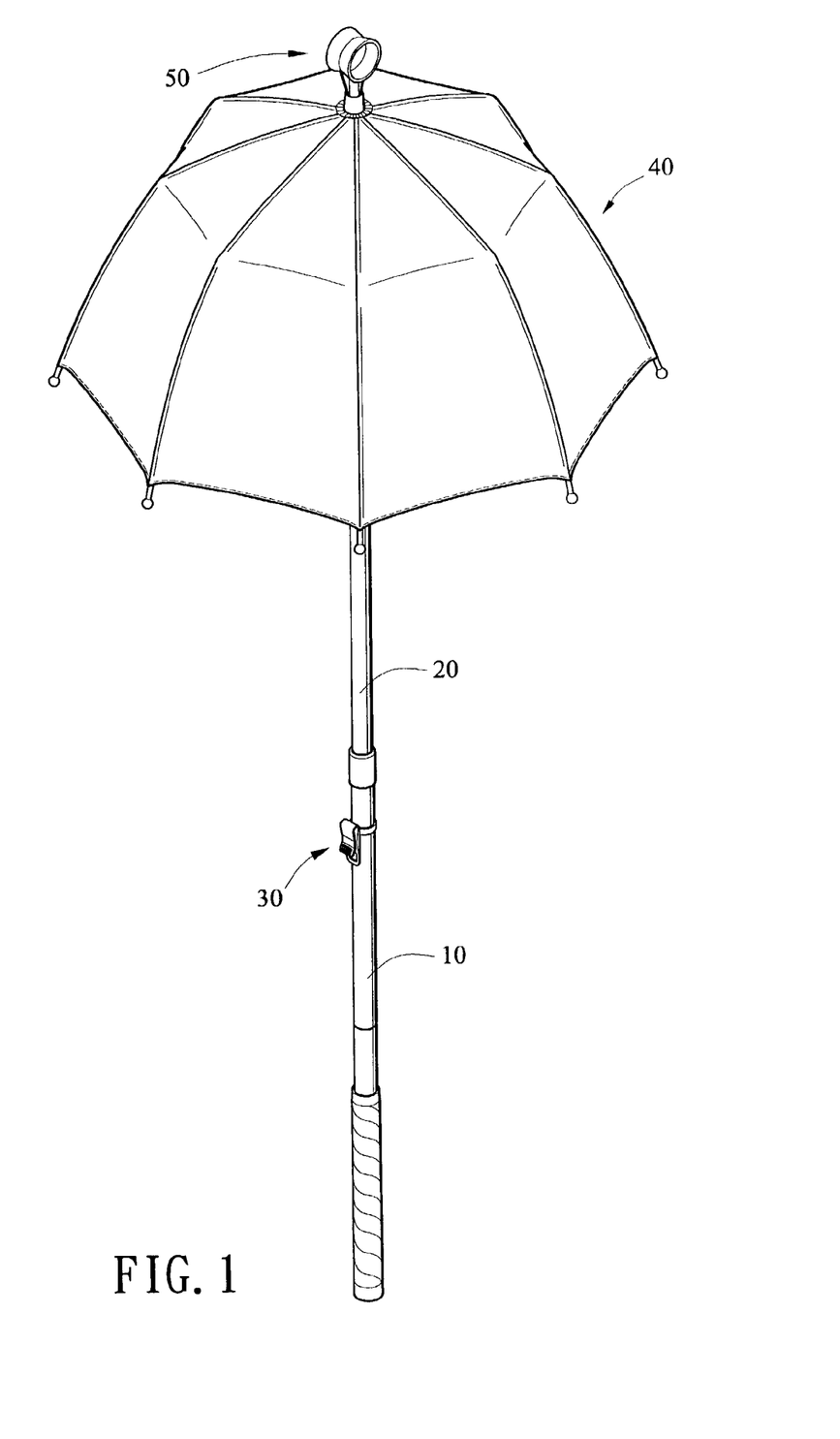
FIG. 1 is a perspective view of a preferred embodiment of a golf bag umbrella according to the invention.
Figure 2:
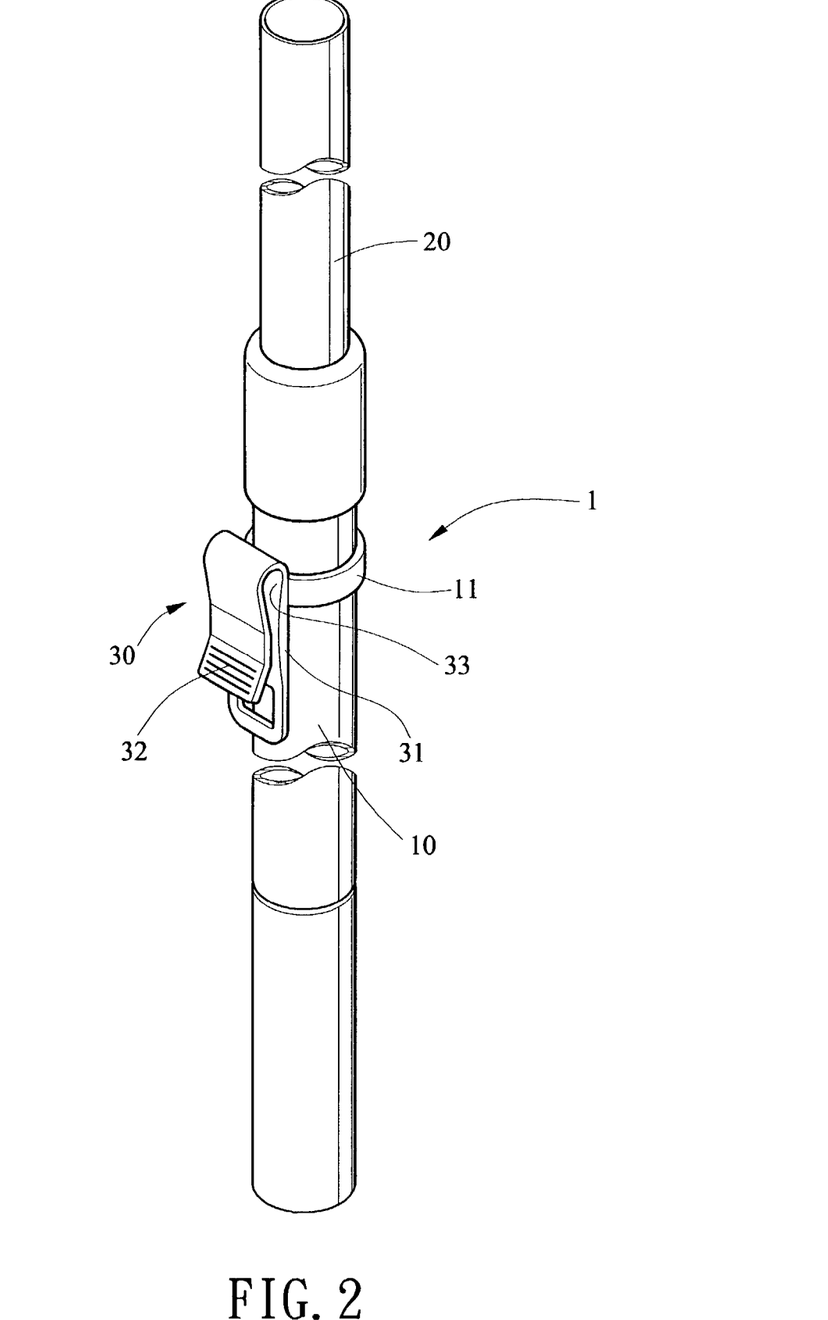
FIG. 2 is a perspective view of shaft shown in FIG. 1.
Figure 3:
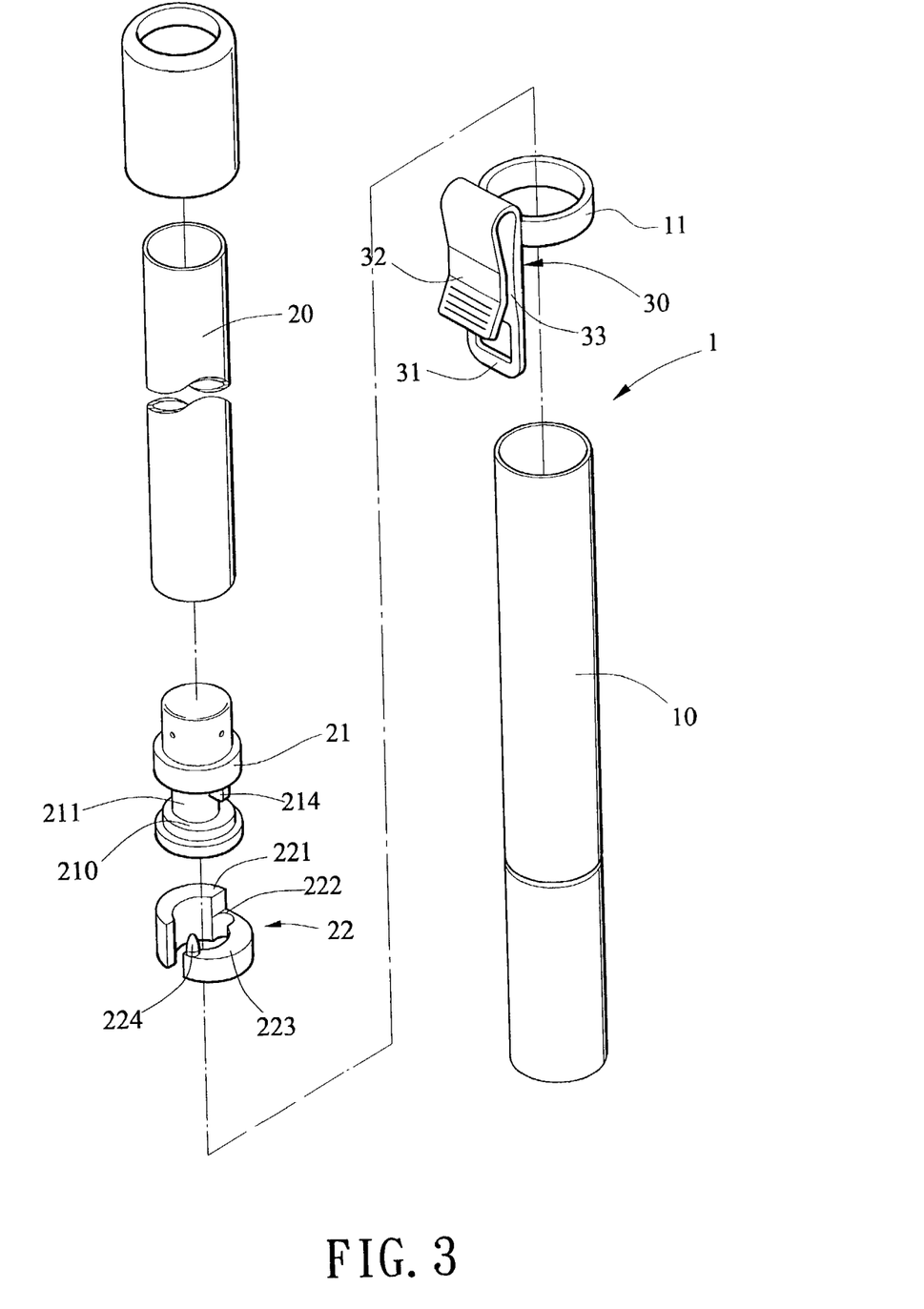
FIG. 3 is an exploded view of the shaft shown in FIG. 2.
Figures 9, 10:
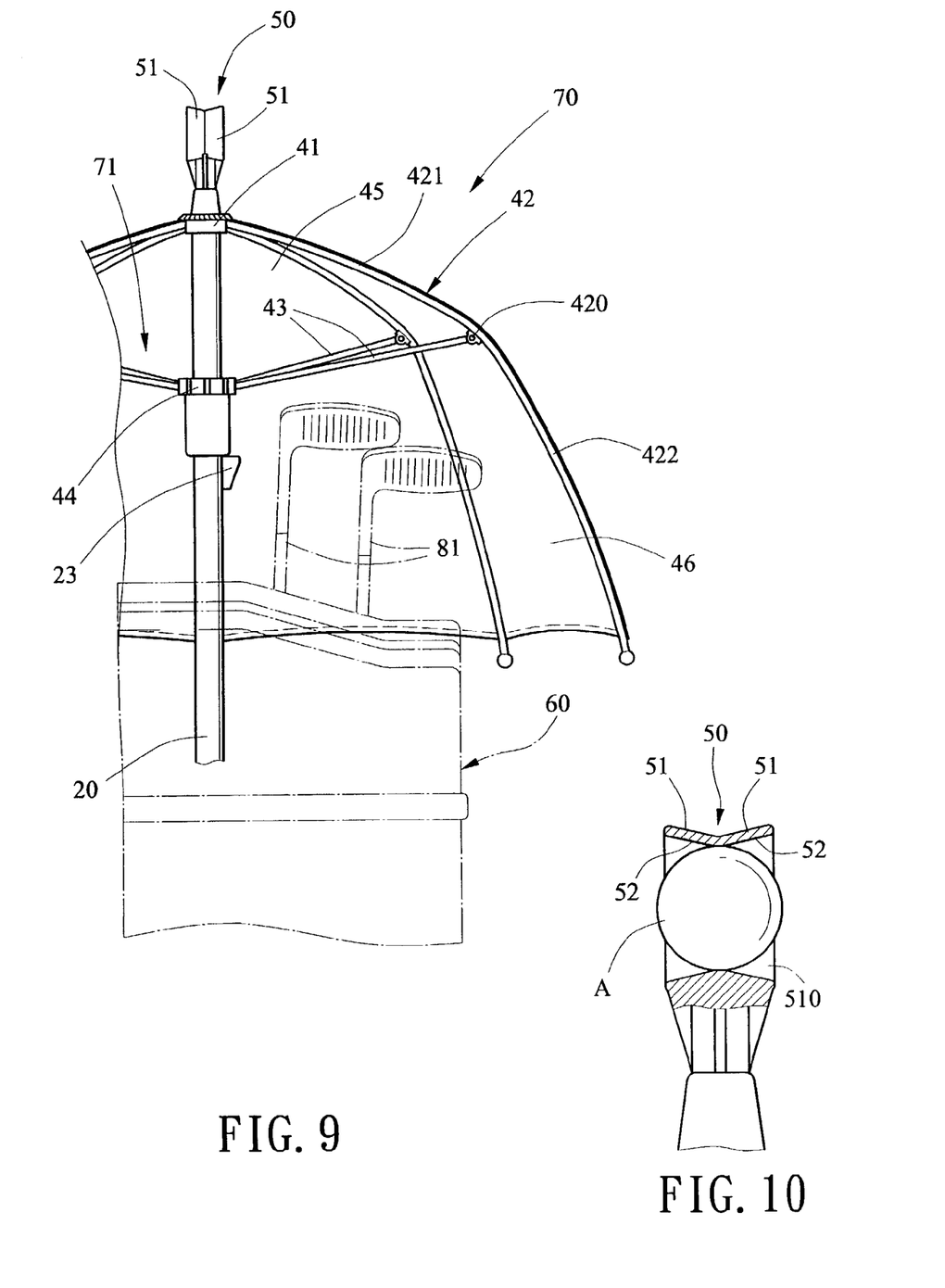
FIG. 9 is a partial perspective view schematically showing golf clubs in the golf bag protected by the fully extended umbrella of the invention.
FIG. 10 is a cross-sectional view of ball receptacle with a golf ball secured therein.

Referring to FIG. 10 in conjunction with FIGS. 1 and 9, a construction of the ball receptacle 50 will now be described in detail below. As shown, the ball receptacle 50 is extended upward from the shaft 1 above the hub 41. The ball receptacle 50 has two opposite flare-shaped members 51 formed of plastics, rubber, or any of other resilient materials. A channel 510 is formed by the flare-shaped members 51. A length of the channel 510 is about two thirds of the diameter of a typical golf ball A. In other words, one third of the golf ball A is exposed when it is fastened in the channel 510 by the elastic force of the channel 510. Such arrangement can facilitate a removal of the golf ball A.

While the invention herein disclosed has been described by means of specific embodiments, numerous modifications and variations could be made thereto by those skilled in the art without departing from the scope and spirit of the invention set forth in the claims.

What is claimed is:

1. An umbrella for use in a golf bag for protecting items stored in the golf bag, the umbrella comprising:
   a telescopic shaft including and upper sliding tube, a lower support tube for slidingly receiving a portion of the upper sliding tube, the lower support tube having a fixed outer diameter, and a ring, the ring having a fixed inner diameter substantially equal to the outer diameter of the lower support tube so as to allow the lower support tube to insert through the ring for fixedly attaching the ring to the lower support tube; and an inverted U-shaped clip fixed to the ring, the clip being capable of fastening to a golf bag; and a canopy frame including an upper hub provided at the top of the sliding tube, a plurality of flexible ribs each having one end pivotably coupled to the upper hub and extended outward therefrom, a plurality of joints each provided at the rib, a lower sliding ring on the sliding tube, and a plurality of stretchers each having one end pivotably coupled to the joint and the other end thereof pivotably coupled to the lower sliding ring, and a canopy disposed over the flexible ribs in order to cover the golf bag when the canopy is fully extended, wherein the sliding tube further comprises an upper collar, and eccentric post having a diameter smaller than that of the sliding tube, a stop extended downward from the collar, and an eccentric C-shaped abutment mechanism sleeved on the eccentric post, the abutment mechanism including an upward protrusion at an open end thereof, wherein the protrusion is substantially opposite to the stop in a first position where the sliding tube is free to slide with respect to the support tube, and about 180 degrees turning of the sliding tube will cause the abutment mechanism to rotate until the protrusion is stopped by the stop at a second position where the outer surface of the abutment mechanisms is urged against the inner surface of the support tube for locking the sliding tube, wherein the abutment mechanism further comprises a thick half circular block, a thin half circular block with the protrusion formed from the open end of the thin half circular block, and a flexible interconnection for coupling the thick and the thin half circular blocks together.

2. The umbrella of claim 1, wherein the clip comprises a lengthwise rectangular plate fixed to the ring, a bent flexible fastening portion, and a recess having a downward opening.

3. The umbrella of claim 1, further comprising an extended ball receptacle provided above the hub, the ball receptacle including two opposite flares formed of plastics or rubber, and a channel through the flares.

4. The umbrella of claim 1, further comprising a latch provided on the shaft, the latch being operative to secure the ring in place when the sliding tube is in a fully extended position of the umbrella.

5. The umbrella of claim 1, wherein each of the joints is formed at a distance of about one third to about two fifths of the length of the rib measured from the hub.

6. The umbrella of claim 1, wherein the ring has a circular perimeter defining the inner diameter of the ring, wherein at least part of the perimeter has a continuous circular section extending from one side of the clip to another side of the clip.

* * * * *